F. D. WILSON.
TRANSMISSION DEVICE.
APPLICATION FILED MAR. 1, 1920.

1,393,870.

Patented Oct. 18, 1921.
3 SHEETS—SHEET 2.

INVENTOR.
Frederick D. Wilson,
BY Walter N. Haskell,
his ATTORNEYS.

F. D. WILSON.
TRANSMISSION DEVICE.
APPLICATION FILED MAR. 1, 1920.
1,393,870.
Patented Oct. 18, 1921.
3 SHEETS—SHEET 3.
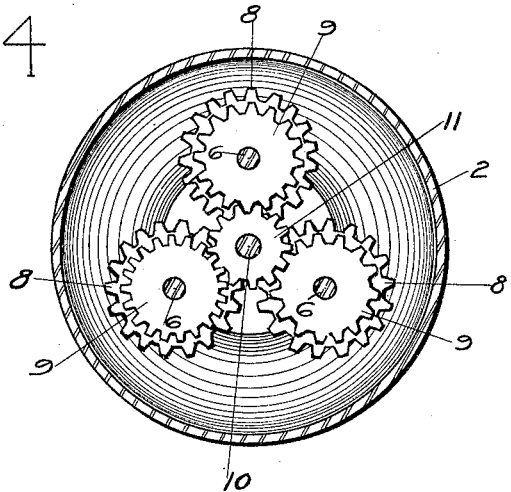
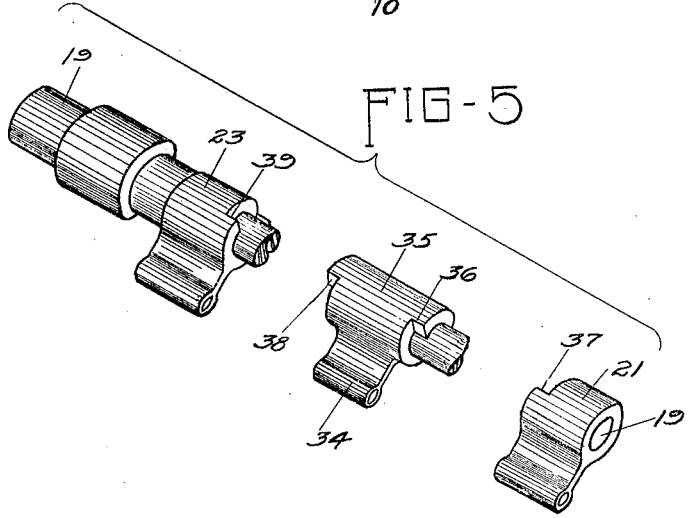
INVENTOR.
Frederick D. Wilson,
BY Walter N. Haskell,
his ATTORNEY

UNITED STATES PATENT OFFICE.

FREDERICK D. WILSON, OF MOLINE, ILLINOIS.

TRANSMISSION DEVICE.

1,393,870.  Specification of Letters Patent.  Patented Oct. 18, 1921.

Application filed March 1, 1920. Serial No. 362,343.

*To all whom it may concern:*

Be it known that I, FREDERICK D. WILSON, a citizen of the United States, residing at Moline, in the county of Rock Island and State of Illinois, have invented certain new and useful Improvements in Transmission Devices, of which the following is a specification.

My invention has reference to transmission devices, such as are made use of for imparting the movement of the main drive shaft of an automobile to the secondary shaft thereof, and for varying the degree of speed at which the secondary shaft is operated. The invention relates specially to mechanism in which is included a planetary system of gears, such as are now well known in the art, and the movement of which is controlled by means of a pair of drums and brake devices, wherein the holding of one of the drums in a stationary position will result in the movement of the secondary shaft at what is known as "low speed," the movement of said shaft being reversed when the other drum is held from movement. In case the drums are connected, so as to rotate together, the result will be a rotation of the secondary shaft at a high rate of speed.

The purpose of the present invention is to provide means for coupling the drums, so as to produce the result just mentioned, and in such a way as not to interfere with other operations of the transmission devices and controlling mechanism therefor. The parts by which such result is accomplished are simple and limited in number, and by the use thereof a great number of parts which are now employed for such purposes are dispensed with.

The above and other purposes and advantages of the invention will more fully appear from the following specification, reference being had to the drawings accompanying the same, in which:

Fig. 4 is an inner end view of the planetary gear system.

Fig. 5 is a perspective view of the shaft 19 and associated parts, in extended positions.

Figure 1:
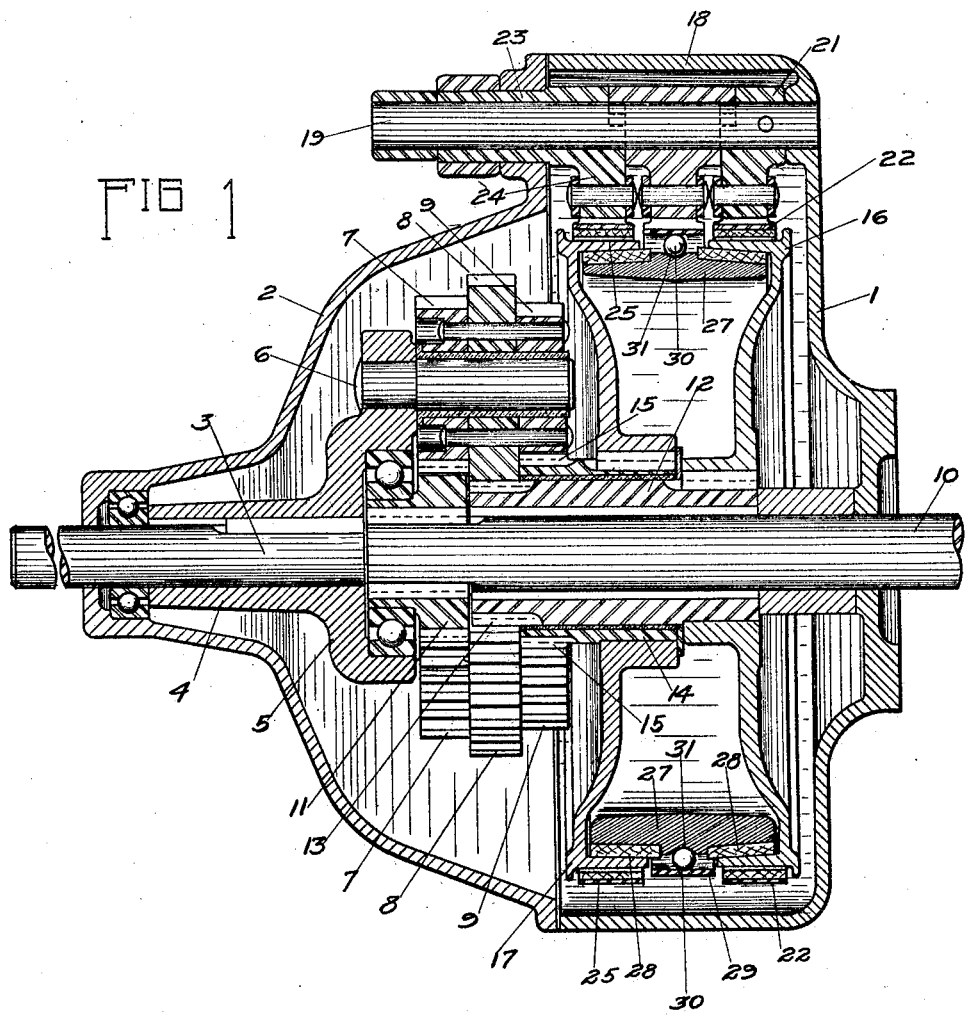
Figure 1 shows the invention in medial longitudinal section, vertically of the transmission casing.
Figure 2:
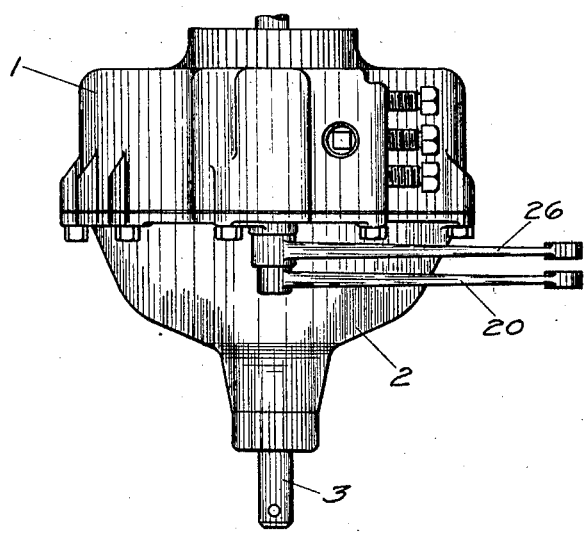
Fig. 2 is a plan view of such casing.
Figure 3:
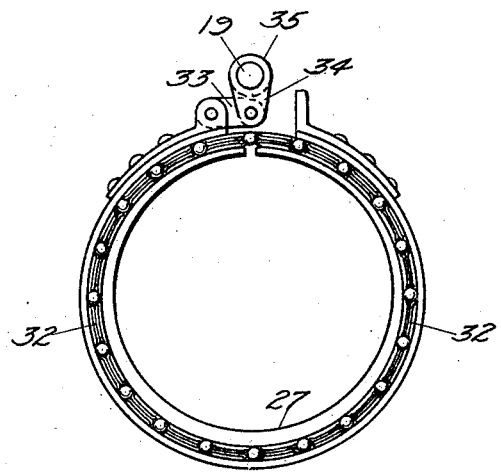
Fig. 3 is a detail of the expansion ring 27 and appurtenant parts.

1 represents a casing, and 2 an extension thereof, in which is journaled one end of a drive-shaft 3, forming a part of or connected with the usual crank-shaft of an engine. Fixed on the shaft 3 is a sleeve 4, having a head 5 in which are secured stud-shafts 6, usually three in number, on each of which shafts is rotatably mounted a triple gear, comprising gear-wheels 7, 8, and 9, which are secured together so as to rotate as a unit.

In the casing 1 is journaled one end of a secondary shaft 10, on the inner end of which is fixed a gear wheel 11, in mesh with the gear-wheels 7. Supported on the shaft 10, so as to rotate independently thereof, is a sleeve 12, on the inner end of which are gear-teeth 13, in mesh with the gear-wheels 8, and on the sleeve 12 is rotatably mounted a relatively shorter sleeve 14, provided on its inner end with gear-teeth 15, in mesh with the gear-wheels 9. Secured to the outer end of the sleeve 12 is a drum 16, and fixed on the outer end of the sleeve 14 is a similar drum 17. If no restraint is placed upon the movement of said drums and the shaft 3 is rotated, the triple gears will be caused to encircle the end of the shaft 10 without imparting any movement thereto, the only effect being to cause a rotation of the drums 16 and 17 in opposite directions. If the drum 16 is held from rotation movement will be imparted to the shaft 10, causing the same to revolve at a low rate of speed. If the drum 17 is held from movement the shaft 10 will be caused to rotate in a contrary direction. The manner in which these various movements are brought about is too well known to require explanation herein, and the mechanism hereinabove set forth is admittedly old.

To hold one or other of the drums 16 and 17 in a stationary position, when desired, the following devices are provided:—In an extension 18 of the casing is journaled a shaft 19, to which is secured at one end a lever 20. Fixed to the opposite end of said shaft is a collar 21, having a projection which is connected with one end of a brake-band 22, the other end of said band being secured in position in the casing in any usual manner, not shown herein. By operation of the lever 20 the shaft 19 can be rocked sufficiently to compress the band 22, causing it to engage the face of the drum 16, and hold the same from rotation. Supported on the shaft 19, so as to have rotation independently thereof, is a sleeve 23, provided with an extension 24, to which is secured one end of a brake-band 25, the other end of which is supported in the casing 18 in the usual manner. Fixed to the sleeve 23 is a lever 26, by means of which said sleeve may be rocked to cause the band 25 to engage the face of the drum 17, and hold the same from rotation. The bands 22 and 25 are normally out of engagement with the drums, so as to permit free action thereof.

Between the drums 16 and 17, on the inside thereof, is an expansion ring 27, the tendency of which is to engage the inner faces of said drums, so as to cause the same to operate together. The face of the ring 27 is provided with friction rings 28, of fiber or other suitable material, which prevents either of the parts from slipping on the other. Encircling the ring 27 is a band 29, held in spaced-apart relation with said band by means of a series of balls 30, held at regular intervals in a groove 31 in the outer face of the ring 27, by means of spacing plates or rings 32. The balls are held in pockets in said plates, so as to project inwardly into engagement with the ring 27 and outwardly against the band 29. The band 29 is adapted at one of its ends for attachment to the casing 18, and at its other end is connected by a link 33 with an arm 34 of a sleeve 35, loosely mounted on the shaft 19 between the sleeves 21 and 23. Upon the sleeve 35 being suitably rocked the band 29 is compressed, contracting the ring 27, and disengaging the same from the drums 16 and 17. Except when thus contracted, the ring 27 causes said drums to rotate in unison, resulting in the operation of the shaft 10 at a high rate of speed, the parts being shown in such an engaged position in Fig. 1 of the drawings.

It is obvious that with the ring 27 normally in engagement with the drums 16 and 17, in order to engage either of said drums with its accompanying brake-band, the ring 27 must first be disengaged therefrom. This may be accomplished by the following described means:—On one end of the sleeve 35 is a shoulder 36, adapted for engagement with an opposing shoulder 37 on the collar 21. The initial movement of the shaft 19 causes an engagement of such shoulders, rocking the sleeve 35, compressing the band 29, and contracting the ring 27, in the manner hereinbefore set forth. A continued movement of the shaft 19 compresses the band 22, causing the same to engage the drum 16. Upon a return movement of the shaft the operation is reversed, the band 22 first being expanded, releasing the drum, and then the band 29 being similarly operated, permitting the ring 27 to again expand. A similar arrangement and operation is had with the sleeve 23, by means of a shoulder 38 on the sleeve 35, adapted for engagement with an opposing shoulder 39 on the end of the sleeve 23. The initial movement of the sleeve 23, upon being rocked by the lever 26, operates to disengage the ring 27, following which the band 25 engages the drum 17, holding the same from rotation. It will be apparent, therefore, that whenever either of said drums is engaged by its accompanying band, the other drum will be free to rotate.

In practice, the rims of the drums 16 and 17 may possess slightly different diameters, so that the ring 27 will not engage one of them as tightly as the other, permitting the larger drum to slip. To provide against this the ring 27 can be split longitudinally from each end for a distance, or can be formed of two rings, united at a central point.

What I claim and desire to secure, is:

1. In combination with a planetary gear transmission mechanism, and brake drums operatively connected therewith; an expansion ring adapted for normal engagement with said drums, to cause the same to rotate as a unit; means for holding either of said drums in fixed position independently of the other; and means for contracting said ring, to disengage the same from said drum.

2. In a device of the class described, the combination with a planetary transmission gear system and pair of drums operatively connected therewith, of an expansion ring adapted for engagement with said drums, to cause the same to rotate together; a band encircling said ring and spaced-apart therefrom; a plurality of balls interposed between said ring and band; and means for compressing said band to disengage said ring from said drums.

3. In a device of the class described, the combination of a main drive shaft and secondary shaft to be driven thereby; a planetary gear system adapted to communicate the movement of one shaft to the other in various ways; a pair of drums operatively connected with said gear mechanism; brake devices associated with said drums, and capable of holding either of said drums in a stationary position independently of the other; an expansion ring adapted for engagement with said drums, to cause the same to operate together; means for contracting said ring to disengage the same from said drums; and means for actuating said last-named means upon the initial movement of either of said brake devices.

4. In a device of the class described, the combination of a main drive shaft and secondary shaft to be actuated thereby; a planetary gear system adapted to communicate the movement of said drive shaft to said secondary shaft in various ways; a pair of drums operatively connected with said gear mechanism; brake devices associated with said drums and capable of holding either one thereof in a stationary position independently of the other; an expansion ring adapted for engagement with said drums to cause the same to operate together; a band supported adjacent to said ring, and capable of contracting the same; rockingly mounted members for actuating said brake devices; and a rocking member for compressing said ring; the initial movement of either of said first-named members operating to actuate said last-named member, and the continued movement thereof operating said brake devices.

5. In a device of the class described, the combination of a pair of shafts, one to be driven by the other; a planetary gear system adapted to communicate the movement of one of said shafts to the other one thereof; a pair of drums operatively connected with said gear mechanism; brake devices associated with said drums, and capable of holding either of said drums in a stationary position independently of the other; an expansion member adapted for engagement with said drums, to cause the same to operate together; means for causing a contraction of said expansion member to disengage the same from said drums; and means for actuating said last-named means upon the initial movement of either of said brake devices.

In testimony whereof I affix my signature.

FREDERICK D. WILSON.